United States Patent
Choi et al.

(10) Patent No.: US 10,635,478 B2
(45) Date of Patent: Apr. 28, 2020

(54) PARALLEL PROCESSING METHOD SUPPORTING VIRTUAL CORE AUTOMATIC SCALING AND APPARATUS THEREFOR

(71) Applicant: ELECTRONICS AND TELECOMMUNICATIONS RESEARCH INSTITUTE, Daejeon (KR)

(72) Inventors: Kang Il Choi, Daejeon (KR); Bhum Cheol Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 142 days.

(21) Appl. No.: 15/821,259

(22) Filed: Nov. 22, 2017

(65) Prior Publication Data
US 2018/0157520 A1 Jun. 7, 2018

(30) Foreign Application Priority Data
Dec. 1, 2016 (KR) .......................... 10-2016-0162458

(51) Int. Cl.
*G06F 9/455* (2018.01)
*H04L 12/931* (2013.01)

(52) U.S. Cl.
CPC .......... *G06F 9/45558* (2013.01); *H04L 49/70* (2013.01); *G06F 2009/45575* (2013.01); *G06F 2009/45595* (2013.01)

(58) Field of Classification Search
None
See application file for complete search history.

(56) References Cited

U.S. PATENT DOCUMENTS 6,854,117 B1   2/2005 Roberts
7,058,010 B2 *  6/2006 Chidambaran ......... H04L 45/16
                                             370/218
(Continued)

FOREIGN PATENT DOCUMENTS

KR    10-2015-0113783 A    10/2015

OTHER PUBLICATIONS

Zhang et al. "An On-Demand Queue Management Architecture for a Programmable Traffic Manager", 2011 IEEE, pp. 1063-1862.*

(Continued)

*Primary Examiner* — Van H Nguyen
(74) *Attorney, Agent, or Firm* — Rabin & Berdo, P.C.

(57) ABSTRACT

A parallel processing method for a traffic having an order, which supports virtual core automatic scaling in a virtual environment having at least one virtual machine (VM) and at least one virtual core queue for each VM, may comprise identifying a flow of the traffic according to attributes of the traffic; determining a virtual core queue to which the traffic is mapped according to the identified flow and queuing the traffic to the determined virtual core queue; and transferring the traffic from the determined virtual core queue to a VM corresponding to the determined virtual core queue through a virtual switch. Also, traffic belonging to a same flow may be queued to a same virtual core queue and processed by a same virtual core.

18 Claims, 5 Drawing Sheets

(56) References Cited

U.S. PATENT DOCUMENTS

| | | | |
|---|---|---|---|
| 7,765,405 B2* | 7/2010 | Pinkerton | H04L 9/3236 |
| | | | 713/181 |
| 7,836,195 B2* | 11/2010 | Veal | H04L 43/026 |
| | | | 370/412 |
| 8,346,999 B2* | 1/2013 | Dubal | H04L 47/122 |
| | | | 370/229 |
| 8,984,526 B2 | 3/2015 | Garg et al. | |
| 9,384,031 B2 | 7/2016 | Shimogawa et al. | |
| 9,571,426 B2* | 2/2017 | Agarwal | H04L 49/9047 |
| 9,594,584 B2* | 3/2017 | Choi | G06F 9/45558 |
| 2015/0277954 A1* | 10/2015 | Choi | G06F 9/45558 |
| | | | 718/1 |

OTHER PUBLICATIONS

Zhang et al. "A Scalable and Programmable Modular Queue Manager Architecture", 2010 IEEE, pp. 1124-1128.*

Ferragut et al. "Design and Analysis of Flow Aware Load Balancing Mechanisms for Multi-Service Networks", 2008 IEEE, pp. 84-91.*

* cited by examiner

PARALLEL PROCESSING METHOD SUPPORTING VIRTUAL CORE AUTOMATIC SCALING AND APPARATUS THEREFOR

CLAIM FOR PRIORITY

This application claims priority to Korean Patent Application No. 2016-0162458 filed on Dec. 1, 2016 in the Korean Intellectual Property Office (KIPO), the entire contents of which are hereby incorporated by reference.

BACKGROUND

1. Technical Field

The present disclosure relates to a parallel processing technology for multi-core virtualization environments, and more particularly, to a parallel processing method and a parallel processing apparatus for performing virtual core automatic scaling according to traffic conditions while maintaining traffic order.

2. Related Art

In a multi-core virtualization environment, traffic having an order may be processed in parallel processing manner through a system including a network interface card (NIC) for receiving traffic, a virtual switch (VS) for switching the traffic received from the NIC to virtual machines (VMs), and the VMs in which a plurality of virtual cores are allocated to perform computation processing and traffic processing.

In such the multi-core virtualization environment, a hash function value (i.e., receive side scaling (RSS) tag value) may be calculated for a part of a header of each traffic packet in the NIC, the each packet traffic packet with the RSS tag in a packet descriptor may be transferred to the VS, and the VS may transfer the RSS tag value to a corresponding VM by performing virtual switching. Also, in a VM that has a plurality of virtual cores allocated to perform computation processing and traffic processing, traffic having the same RSS Tag value may be transferred to the same virtual core, thereby enabling parallel processing of the traffic having an order.

However, such the system performs a load distribution function for the virtual cores in the VM for traffic in the parallel processing of the VMs, but does not provide a scaling function for the virtual cores of the VM as the amount of network traffic increases or decrease.

Accordingly, in addition to a parallel processing technique for sequential traffic in a multi-core virtualization environment, an automatic virtual core scaling method of a VM according to the network traffic condition without raising the re-ordering problem of traffic is required.

SUMMARY

Accordingly, exemplary embodiments of the present disclosure are provided to substantially obviate one or more problems due to limitations and disadvantages of the related art.

Exemplary embodiments of the present disclosure provide a parallel processing method in which a virtual core automatic scaling according to traffic conditions is performed while maintaining traffic order in a virtual switch system for a multi-core virtualization environment. Also, exemplary embodiments of the present disclosure provide a parallel processing apparatus for the same.

Technical objects of the present disclosure are not limited to the aforementioned technical objects and other technical objects which are not mentioned will be apparently appreciated by those skilled in the art from the following description.

In order to achieve the above-described objective, an aspect of the present disclosure provides a parallel processing method for a traffic having an order, which supports virtual core automatic scaling in a virtual environment having at least one virtual machine (VM) and at least one virtual core queue for each VM, comprising identifying a flow of the traffic according to attributes of the traffic; determining a virtual core queue to which the traffic is mapped according to the identified flow and queuing the traffic to the determined virtual core queue; and transferring the traffic from the determined virtual core queue to a VM corresponding to the determined virtual core queue through a virtual switch. Also, traffic belonging to a same flow may be queued to a same virtual core queue and processed by a same virtual core.

In the identifying a flow of the traffic, the flow of the traffic may be identified based on a hash function value for specific information in a header of a packet belonging to the traffic. Also, the specific information in the header of the packet belonging to the traffic may be a combination of at least one field value of a source IP address (SIP), a destination IP address (DIP), a source port (SPORT), a destination port (DPORT), and a protocol version (PROTOCOL).

In the queuing the traffic, the traffic may be stored in a data buffer, and a pointer pointing to a location where the traffic is stored in the data buffer may be queued to the determined virtual core queue.

In the queuing the traffic, the traffic may be queued to the virtual queue allocated to the identified flow when the virtual core queue allocated to the identified flow exists; and the traffic may be queued to a virtual core queue selected from virtual core queues belonging to the VM allocated to the identified flow or a newly created virtual core queue when the virtual core queue allocated to the identified flow does not exist. Also, the virtual core queue to which the traffic is queued may be selected from the virtual core queues belonging to the VM allocated to the identified flow based on at least one of a power saving policy and an operation switching policy.

In the transferring the traffic, the traffic may be transferred to a virtual core corresponding to the determined virtual core queue in the VM to which the determined virtual core queue belongs. Also, the traffic may be transferred to the virtual core corresponding to the determined virtual core queue in the VM to which the determined virtual core queue belongs based on meta information included in the traffic.

In order to achieve the above-described objective, another aspect of the present disclosure provides a parallel processing apparatus for a traffic having an order, which supports virtual core automatic scaling, comprising a virtual machine (VM) manager for creating and managing at least one or more VM; a virtual core queue manager for creating and managing at least one virtual core queue for each VM; a virtual core queue mapper for identifying a flow of the traffic according to attributes of the traffic, determining a virtual core queue to which the traffic is mapped according to the identified flow, and queuing the traffic to the determined virtual core queue; and at least one virtual switch for transferring the traffic from the determined virtual core queue to a VM corresponding to the determined virtual core queue. Also, traffic belonging to a same flow may be queued to a same virtual core queue and processed by a same virtual core.

The virtual core queue mapper may identify the flow of the traffic based on a hash function value for specific information in a header of a packet belonging to the traffic. Also, the specific information in the header of the packet belonging to the traffic may be a combination of at least one field value of a source IP address (SIP), a destination IP address (DIP), a source port (SPORT), a destination port (DPORT), and a protocol version (PROTOCOL).

The apparatus may further comprise a flow table defining relationship between traffics and flows, and the virtual core queue mapper may identify the flow of the traffic based on the flow table.

The apparatus may further comprise a virtual switch manager managing the at least one virtual switch. Also, the virtual switch manager may add a new virtual switch, or deactivate a part of the at least one virtual switch according to a processing load of the at least one virtual switch.

The virtual core queue mapper may store the traffic in a data buffer, and queue a pointer pointing to a location where the traffic is stored in the data buffer to the determined virtual core queue.

The virtual core queue mapper may queue the traffic to the virtual queue allocated to the identified flow when the virtual core queue allocated to the identified flow exists; and queue the traffic to a virtual core queue selected from virtual core queues belonging to the VM allocated to the identified flow or a newly created virtual core queue when the virtual core queue allocated to the identified flow does not exist. Also, the virtual core queue to which the traffic is queued may be selected from the virtual core queues belonging to the VM allocated to the identified flow based on at least one of a power saving policy and an operation switching policy.

The VM corresponding to the determined virtual core queue may include a virtual network interface card (vNIC) and a virtual distributor (vDistributor) which transfer the traffic transferred from the virtual switch to the determined virtual core queue. Also, the traffic may be transferred to a virtual core corresponding to the determined virtual core queue in the VM to which the determined virtual core queue belongs based on meta information included in the traffic.

According to the embodiments of the present disclosure as described above, a technique for parallel processing of a traffic having an order in a multi-core virtual environment may be provided. Also, automatic scaling of virtual cores can be performed according to the network traffic condition without re-ordering the traffic.

BRIEF DESCRIPTION OF DRAWINGS

Exemplary embodiments of the present disclosure will become more apparent by describing in detail exemplary embodiments of the present disclosure with reference to the accompanying drawings, in which.

DESCRIPTION OF EXEMPLARY EMBODIMENTS

Figure 1:
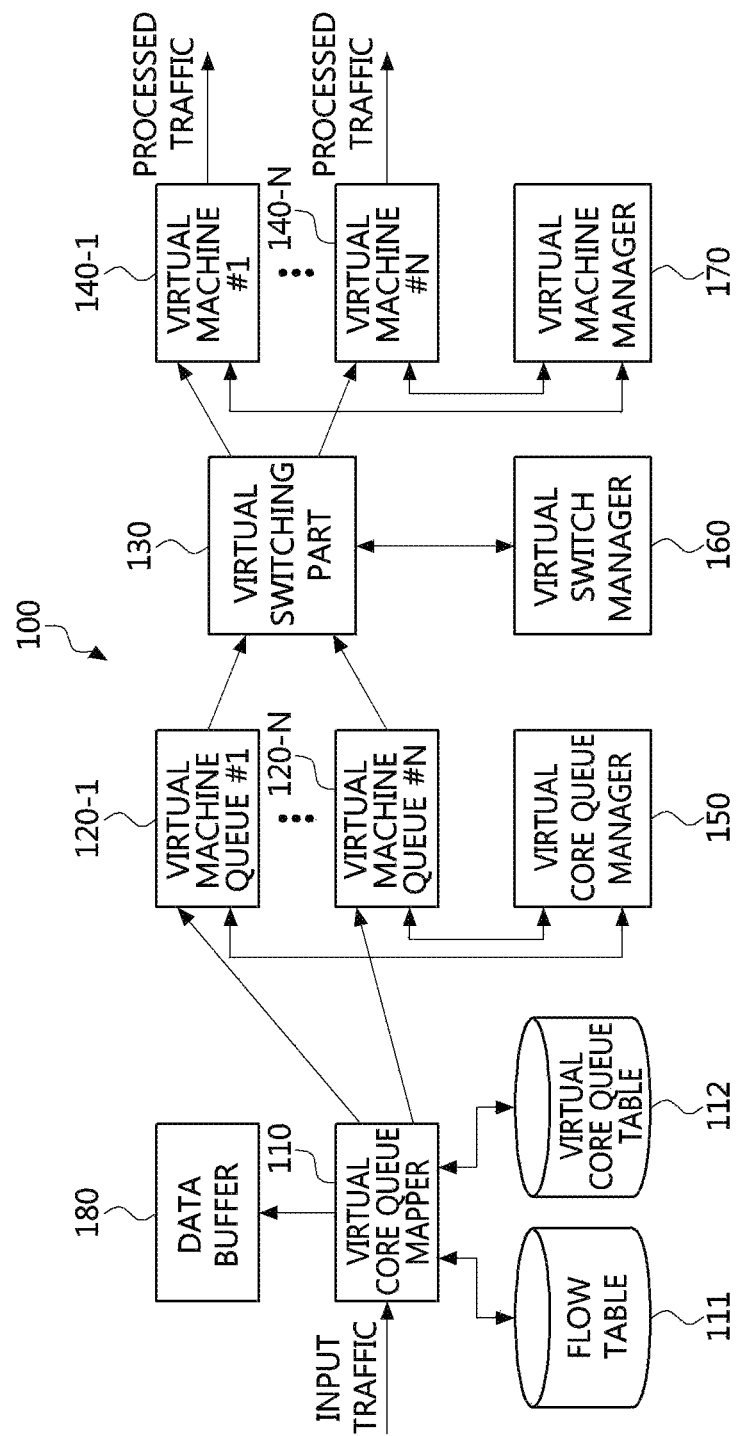
FIG. 1 is a block diagram illustrating a configuration of a parallel processing apparatus supporting virtual core automatic scaling according to an embodiment of the present disclosure.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Combinations of respective blocks in an accompanying block diagram and respective operations in a flowchart may be performed by computer program instructions. These computer program instructions can be mounted on a processor of a general purpose computer, a special purpose computer, or other programmable data processing equipment, and thus the instructions performed by the processor of the computer or other programmable data processing equipment generate a means for performing functions described in the respective blocks of the block diagram or the respective operations of the flowchart. To implement functions in a specific way, these computer program instructions can be stored in a computer-usable or computer-readable memory capable of aiming for a computer or other programmable data processing equipment, so that the instructions stored in the computer-usable or computer-readable memory can also produce a manufactured item including an instruction means for performing functions described in the respective blocks of the block diagram or the respective operations of the flowchart.

In addition, each block or operation may indicate a part of a module, a segment or a code including one or more executable instructions for executing specific logical function(s). It should be noted that mentioned functions described in blocks or operations can be executed out of order in some alternative embodiments. For example, two consecutively shown blocks or operations can be performed substantially at the same time, or can be performed in a reverse order according to the corresponding functions.

Hereinafter, exemplary embodiments according to the present disclosure will be described in detail by referring to accompanying drawings.

FIG. 1 is a block diagram illustrating a configuration of a parallel processing apparatus supporting virtual core automatic scaling according to an embodiment of the present disclosure.

Referring to FIG. 1, a parallel processing apparatus 100 supporting virtual core automatic scaling according to an embodiment of the present disclosure may comprise a virtual core queue mapper 110, at least one virtual machine (VM) queue 120-1, . . . , and 120-N, a virtual switching part 130, and at least one VM 140-1, . . . , and 140-N.

Here, the at least one VM queue 120-1 to 120-N may be managed by a virtual core queue manager 150 and the at least one VM 140-1 to 140-N may be managed by a VM manager 170. That is, the number of virtual core queues and VMs existing in the apparatus 100 at any point in time may dynamically change according to a processing load, and these may be controlled by the managers 150 and 170.

Meanwhile, the number (e.g., N) of VM queues existing in the parallel processing apparatus 100 may correspond to the number (e.g., N) of VMs existing in the parallel processing apparatus 100. Also, there may be at least one (e.g., x or y) virtual cores in one VM, and a VM queue corresponding to the VM may have the number (e.g., x or y) of virtual core queues corresponding to the number (e.g., x or y) of virtual cores. That is, in the parallel processing apparatus 100 according to an embodiment of the present disclosure, one or more independent virtual core queues may exist for each VM. Also, the number of virtual core queues may be different for each VM.

The virtual switching part 130 may be composed of at least one virtual switch (VS). Depending on the configuration, the number of VSs existing in the virtual switching part 130 may also be dynamically varied. In this case, a virtual switch manager 160 managing the virtual switching part 130 and the virtual switches existing in the virtual switching part 130 may be additionally included in the apparatus 100.

Also, the parallel processing apparatus 100 may further comprise at least one of a flow table 111, a virtual core queue table 112, and a data buffer 180. Roles and functions of the respective components constituting the above-described parallel processing apparatus 100 will be described in detail with reference to FIG. 3 and FIG. 4.

Figure 2:
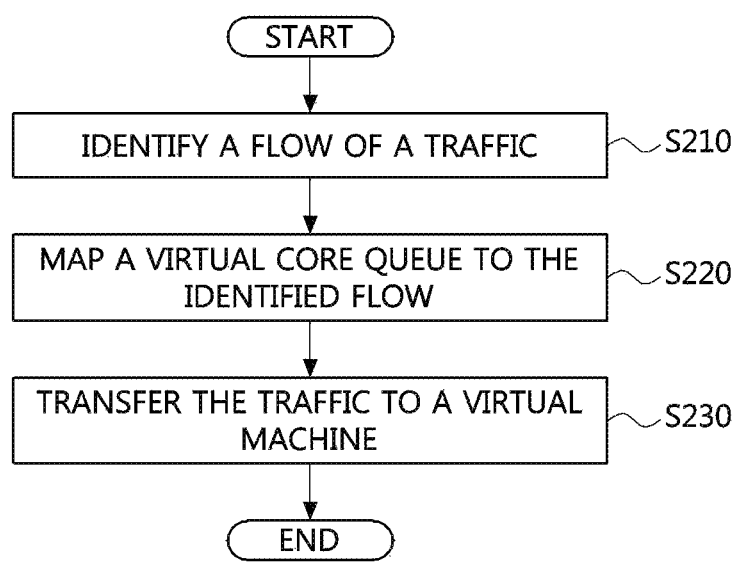
FIG. 2 is a flowchart for explaining a parallel processing method for supporting virtual core automatic scaling according to an embodiment of the present disclosure.

FIG. 2 is a flowchart for explaining a parallel processing method for supporting virtual core automatic scaling according to an embodiment of the present disclosure.

Referring to FIG. 2, a parallel processing method for virtual core automatic scaling according to an embodiment of the present disclosure may comprise a step S210 of identifying a flow of input traffic (order traffic), a step S220 of mapping a virtual core queue, and a step S230 of transferring the traffic to a VM. Also, in an embodiment of the present disclosure, a traffic belonging to the same flow may be transferred to the same virtual core queue in order not to cause a re-ordering problem of the ordered traffic.

First, in the step S210 of identifying a flow of input traffic, a flow to which the input traffic belongs may be identified according to attributes of the input traffic.

In the step S210, based on a value (e.g., RSS tag value) obtained by mapping specific information of the input traffic packet header to a value of a predetermined size using a hash function, a flow to which the input traffic belongs may be identified. Also, a flow to which the input traffic belongs may be identified by using a value obtained by combining the hash function value (e.g., RSS tag value) and identification information of a VM in which the corresponding traffic is processed. For example, a traffic composed of packets having the same value obtained by combining the hash function value and the identification information of the VM to be processed may be defined as a flow.

In this case, information on the identified flow may be stored in the flow table 111 illustrated in FIG. 1. The flow table 111 may include information on a VM to which the identified flow is mapped and virtual core queues belonging to respective VMs, and may be continuously updated. The update to the flow table 111 may generally be performed by the virtual core queue mapper 1110. However, the update to the flow table 111 may also be performed by at least one of the virtual core queue manager 150 and the VM manager 170.

The specific information of the traffic packet header to be input to the hash function may be at least one of a source IP address (SIP), a destination IP address (DIP), a source port (SPORT), a destination port (DPORT), and a protocol version (PROTOCOL).

Then, in the step 220 of mapping a virtual core queue, the VM and the virtual core queue of the VM to process the input traffic may be determined according to the identified flow, and the input traffic may be queued to the determined virtual core queue.

As described above, in an embodiment of the present disclosure, after the flow to which the input traffic belongs is identified through the step S210, the flow table may be checked to determine which virtual core queue to process the identified flow.

At this time, if it is confirmed that there is no virtual core queue mapped to the identified flow as a result of checking the flow table, since the identified flow is a new flow, the status of the virtual core queue table 112 may be checked to determine whether or not all the virtual core queues belonging to the VM exceed a threshold value. In case that there is at least one virtual core queue that does not exceed the threshold value among the virtual core queues belonging to the VM, the new flow may be mapped to one a virtual core queue from the at least one virtual core queue that does not exceed the threshold value, and queued in the selected virtual core queue.

If all the virtual core queues belonging to the VM exceed the threshold value, a new virtual core queue belonging to VM may be created and activated, the identified flow may be mapped to the newly-activated virtual core queue, and may be queued to the newly-activated virtual core queue.

Meanwhile, when the corresponding traffic is queued to the virtual core queue, data of the traffic may not be queued as a whole, but the data may be stored in the data buffer 180, and only a pointer indicating a location (address) of the data may be queued in the virtual core queue.

Meanwhile, in the determining whether the virtual core queues belonging to the VM exceed the threshold value in the above-described the step S220, the threshold value may be a threshold value for the length of the virtual core queues.

Also, in the mapping the flow to the virtual core queue that does not the threshold value in the step S220, a dynamically configurable policy such as a power saving policy, an operation switching policy, or the like may be used. For example, according to the power saving policy, the flow may be mapped to a virtual core queue in which the largest amount of traffic is queued among the existing virtual core queues that do not exceed the threshold value. For example, according to the operation switching policy, the flow may be mapped to a virtual core queue in which the least traffic is queued among the existing virtual core queues that do not exceed the threshold value.

On the other hand, once the mapping for the new flow is completed, the flow table 111 may be updated by reflecting the new flow, so that traffic belonging to the same flow can be queued to the same virtual core queue. As noted above, updates to the flow table 111 may be made by at least one of the virtual core queue mapper 110, the virtual core queue manager 150, and the VM manager 170.

In the embodiments of the present disclosure, traffic having the order belonging to the same flow may be processed by the same virtual core of the same VM. Two or more virtual cores can concurrently process two or more flows each at the same time, but traffic of the same flow may not be processed by two or more virtual cores in order to maintain the order of the traffic to be processed.

Then, in the step S230 of transferring the traffic to the VM, the traffic may be transferred, through the virtual switch, from the determined virtual core queue to the VM to which the virtual core corresponding to the determined virtual core queue belongs. The virtual core corresponding to the determined virtual core queue may process the traffic received through the virtual switch.

The information on the VM and the virtual core queue to which the traffic is allocated determined in the step S220 may be included in the corresponding traffic as meta information, and may be transferred to the virtual switching part 130. The virtual switching part 130 may refer to the meta information, and transfer the corresponding traffic to a virtual network interface card (vNIC) of the corresponding VM.

According to an embodiment of the present disclosure, a virtual distributor (vDistributor) in the vNIC of the VM may allocate the traffic to the corresponding virtual core based on the meta information included in the traffic. The virtual distributor in the vNIC may allocate the traffic allocated to the same virtual core queue to the same virtual core to enable virtual core automatic scaling according to the amount of traffic in the VM.

Meanwhile, in the present embodiment, the virtual core queue mapper 110 may periodically check the flow table, and may initialize the content of the flow table with respect to inactivate flows. Also, the virtual core queue mapper 110 or the virtual core queue manager 150 may periodically check the flow table 111 and the virtual core queue table 112 to dynamically deactivate the virtual core queues which can be deactivated. Information on the deactivated virtual core queues may be reflected in the virtual core queue table 112. Also, when a virtual core queue is deactivated, a virtual core processing the deactivated virtual core queue may also be deactivated at the same time. Also, when a VM is created or destroyed, the VM manager 170 may provide information on virtual cores of the VM to be created or destroyed.

Meanwhile, the virtual switch manager 160 may also periodically check the statuses of the virtual switches in the virtual switching part 130 to dynamically inactivate virtual switches which can be deactivated.

Figure 3:
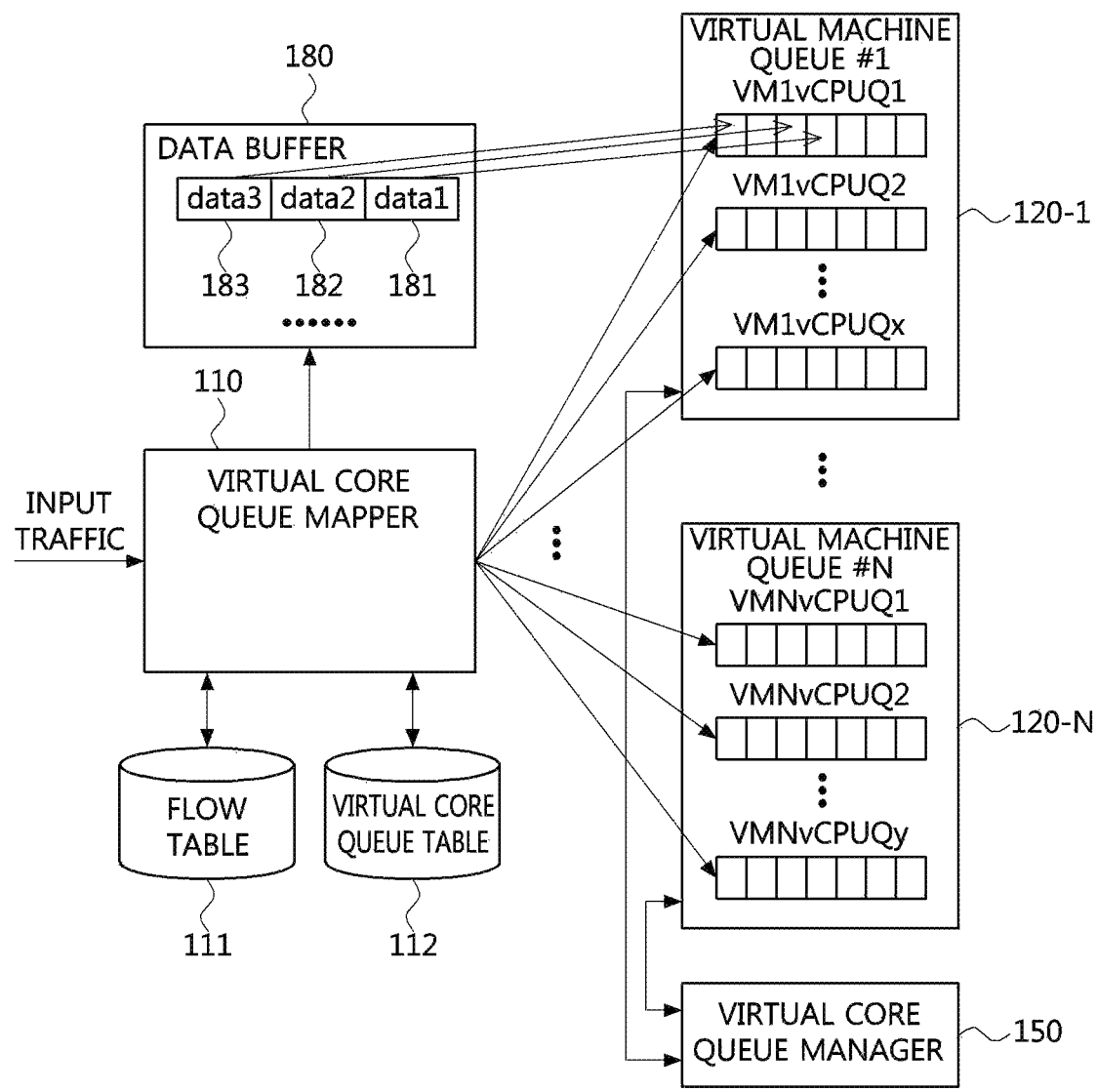
FIG. 3 is a detailed block diagram for explaining an operation of a virtual core queue mapper in a parallel processing apparatus supporting virtual core automatic scaling according to an embodiment of the present disclosure.

FIG. 3 is a detailed block diagram for explaining an operation of a virtual core queue mapper in a parallel processing apparatus supporting virtual core automatic scaling according to an embodiment of the present disclosure.

Referring to FIG. 3, the virtual machine queue 120-1 may include x virtual core queues VM1vCPUQ1, VM1vCPUQ2, . . . , and VM1vCPUQx corresponding to x virtual cores vCPU1, vCPU2, . . . , and vCPUx belonging to the first VM 140-1.

Also, the virtual machine queue 120-N may include y virtual core queues VMNvCPUQ1, VMNvCPUQ2, . . . , and VMNvCPUQy corresponding to y virtual cores vCPU1, vCPU2, . . . , and vCPUy belonging to the N-th VM 140-N.

As described with reference to FIGS. 1 and 2, the virtual core queue mapper 110 may identify the flow to which the input traffic belongs based on the attributes of the input traffic.

At this time, as described above, the flow may be identified using a combination of a value (e.g., RSS tag value) obtained by mapping a combination of a value obtained by mapping one or more of the fields such as SIP, DIP, SPORT, DPORT, and PROTOCOL to a value of a predetermined size by using a hash function and identification information of the VM in which the traffic is processed.

Also, when classifying a traffic having an order in accordance with its attributes, the flow table 111 may be maintained in such a manner that the traffic classified as having the same attributes is defined as a flow. The flow table may include information on which VM and virtual core queues the flow is mapped to among one or more VMs and virtual core queues.

Accordingly, the virtual core queue mapper 110 may identify the flow to which the input traffic belongs, and determine the VM and virtual core queue to which the identified flow is mapped by checking the flow table 111.

As a result of checking the flow table 111, if there is no virtual core queue mapped to the identified flow, the virtual core queue mapper 110 may recognize the flow as a new flow. In this case, the virtual core queue mapper 110 may check the information of the virtual core queue table 112, and check whether the virtual core queues belonging to the VM corresponding to the flow exceed a threshold value.

If there is at least one virtual core queue that does not exceed the threshold value among the virtual core queues belonging to the VM corresponding to the flow, the new flow may be mapped to a virtual core queue selected from the at least one virtual core queue, and queued in the mapped virtual core queue.

On the other hand, if all the virtual core queues belonging to the VM corresponding to the flow exceed the threshold value, a new virtual core queue may be created, and the flow may be mapped to the newly-created virtual core queue, and queued in the mapped virtual core queue.

On the other hand, when the virtual core queue mapper identifies the flow for the input traffic and queues the flow to the virtual core queue of the corresponding VM, data of the traffic may not be queued in the virtual core queue, but the data 181, 182, and 183 of the traffic may be stored in the data buffer 180, and only a pointer indicating a location where the traffic data is stored may be queued in the virtual core queue. This may reduce the size of the memory to be allocated to the virtual core queue and reduce the memory access time due to frequent data movement.

The mapping of the input traffic to the new virtual core queue may be performed dynamically. For example, when the virtual core queue mapper 110 needs to map the new flow to the new virtual core queue, the virtual core queue mapper 110 may request the virtual core queue manager 150 to activate the new virtual core queue, and the virtual core queue manager 150 may update the virtual core queue table 112 after activating the new virtual core queue.

Then, the virtual core queue manager 150 may inform the virtual switch manager 160 of the activation of the new virtual core queue. The virtual switch manager 160 may change configuration of the existing virtual switch through the virtual core queue manager 150 so that the traffic output from the virtual core queue is transferred to the corresponding VM. The virtual core queue manager 150 may inform the virtual core queue mapper 110 of information on the newly-activated virtual core queue. The virtual core queue mapper 110 may map the new flow by using information on the virtual core queues notified by the virtual core queue manager.

When the virtual core queue mapper 110 determines whether the virtual core queues belonging to the corresponding VM existing in the virtual core queue table 112 exceed the threshold value, the threshold value may be a threshold for the length of the virtual core queues belonging to the VM.

Also, when the virtual core queue mapper 110 maps the new flow to the existing virtual core queue, a dynamically configurable policy such as a power saving policy, an operation switching policy, or the like may be used.

For example, in case that the virtual core queue mapper 110 performs virtual core queue mapping according to the power saving policy, the flow may be mapped to a virtual core queue in which the largest amount of traffic is queued among the existing virtual core queues that do not exceed the threshold value. For example, in case that the virtual core queue mapper 110 performs virtual core queue mapping according to the operation switching policy, the flow may be mapped to a virtual core queue in which the least traffic is queued among the existing virtual core queues that do not exceed the threshold value. Also, in the present embodiment, the virtual core queue mapper 110 may store information on the virtual core queue to which the traffic is mapped and the VM to which the virtual core queue belongs as meta information in the corresponding traffic.

When the virtual core queue mapping for the new flow is completed, the virtual core queue mapper 100 may update the flow table 111 with respect to the flow, so that the traffic belonging to the same flow arriving thereafter can be queued to the same virtual core queue and the same VM.

Also, in the present embodiment, the virtual core queue mapper 110 may periodically check the flow table, and initialize the content of the flow table with respect to the inactive flow.

Figure 4:
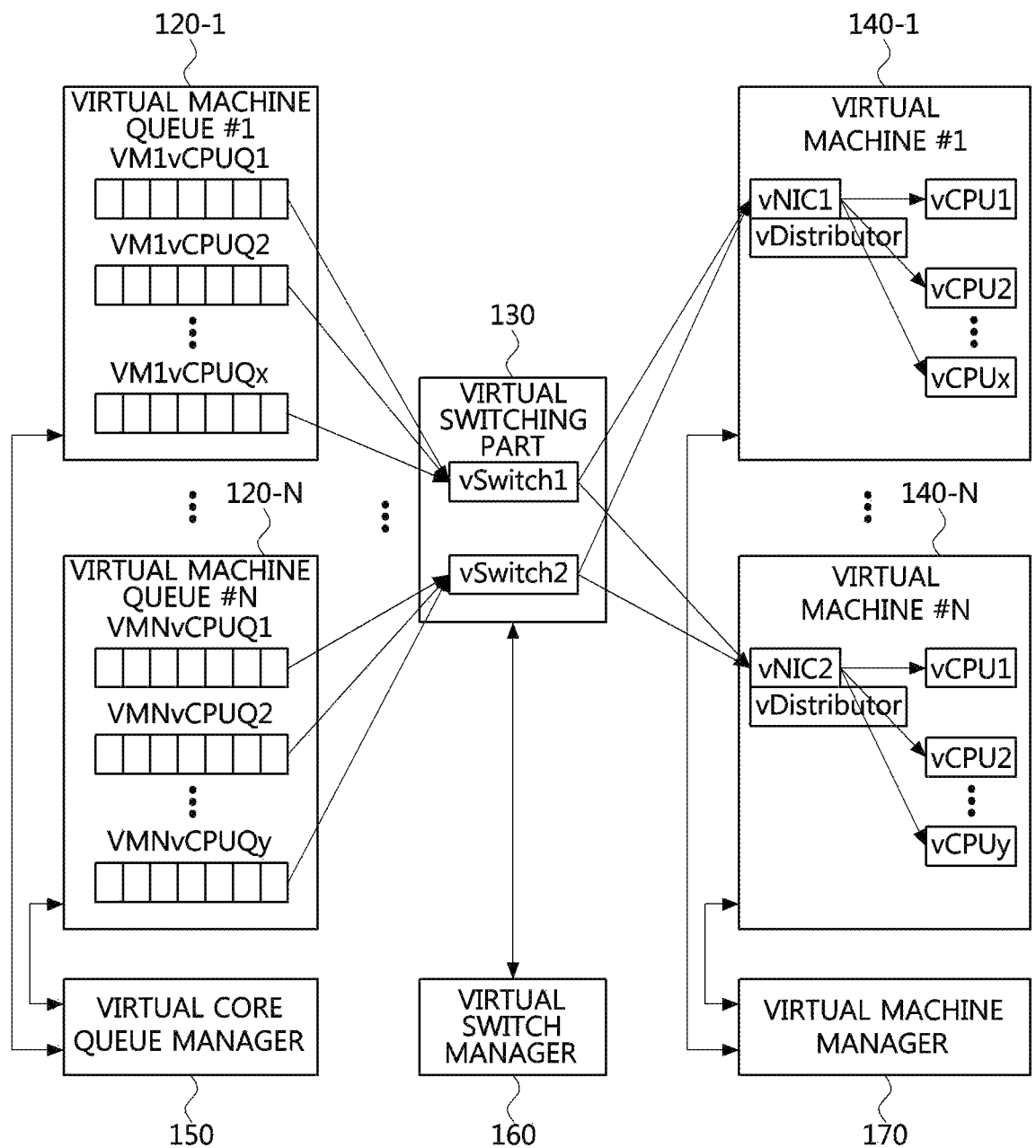
FIG. 4 is a detailed block diagram for explaining an operation of a virtual switch in a parallel processing apparatus supporting virtual core automatic scaling according to an embodiment of the present disclosure.

FIG. 4 is a detailed block diagram for explaining an operation of a virtual switch in a parallel processing apparatus supporting virtual core automatic scaling according to an embodiment of the present disclosure.

An operation of a virtual switch for transferring traffic output from a virtual core queue to a VM and a virtual core mapped to the traffic will be described.

In an embodiment of the present disclosure, a virtual switch (e.g., a first virtual switch; vSwitch1) may be activated in the virtual switching part 130 to support virtual core automatic scaling.

The first virtual switch may switch traffic queued in one or more virtual core queues to the VM. Then, if the traffic exceeds a processing threshold value, the virtual switch manager 160 may dynamically add a new virtual switch (e.g., a second virtual switch; vSwitch2), and two or more virtual switches may simultaneously process the traffic queued in the one or more virtual core queues in parallel. Here, the processing threshold value of the corresponding virtual switch may be set dynamically by the virtual switch manager 160.

The virtual switch (vSwitch1 or vSwitch2) may process the traffic queued in the virtual core queues according to switching policies such as a round robin (RR) policy, a weighted round robin (WRR) policy, and the like. Also, the virtual switch manager 160 may dynamically set a switching policy for each virtual switch.

Further, in order to guarantee the order of the traffic belonging to the same flow, different virtual switches may not simultaneously switch the traffic queued in one virtual core queue.

The virtual switch may refer to the meta information included in the traffic, which specifies the VM and the virtual core queue mapped to the corresponding traffic, and may transfer the traffic to the vNIC of the designated VM.

The virtual core queue mapper 110 may periodically check the flow table 111 and the virtual core queue table 112 to dynamically deactivate the virtual core queues which can be deactivated. Also, the virtual core queue mapper 110 may notify the virtual core queue manager 150 of information on the virtual core queues which can be deactivated. Also, the virtual core queue manager 150 may inform the virtual switch manager 160 of information on the virtual core queues which can be deactivated. Here, the virtual switch manager 160 may deactivate the information on the virtual core queue configured in the virtual switch. Also, the virtual switch manager 160 may periodically check the statuses of the virtual switches to dynamically deactivate the inactive virtual switches.

Meanwhile, the VM manager 170 may perform life cycle management (LCM) on at least one VM. Also, whenever a VM is created or destroyed, the VM manager 170 may notify the virtual core queue mapper 110 of information on virtual cores of the created or destroyed VM, or store the information in the virtual core queue table 112.

The virtual distributor in the vNIC of the VM may allocate the transferred traffic to the corresponding virtual core based on the meta information included in the traffic. In the present embodiment, the virtual distributor in the vNIC of the VM may allocate the traffic allocated to the same virtual core queue to the same virtual core, thereby enabling the automatic core scaling according to the amount of traffic in the VM.

Figure 5:
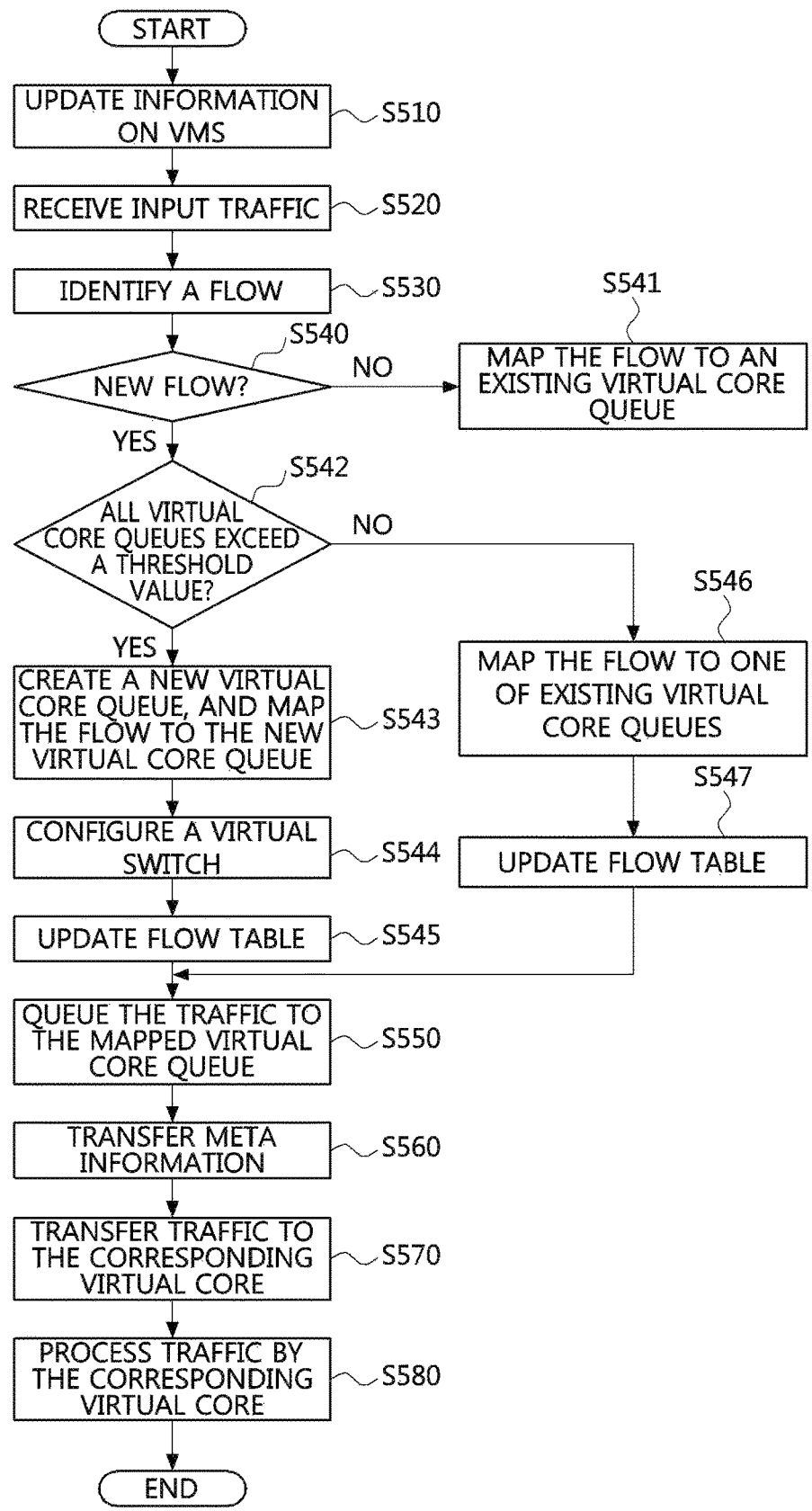
FIG. 5 is a detailed flowchart for explaining a parallel processing method for supporting virtual core automatic scaling according to an embodiment of the present disclosure.

FIG. 5 is a detailed flowchart for explaining a parallel processing method for supporting virtual core automatic scaling according to an embodiment of the present disclosure.

Referring to FIG. 5, each time a VM is created or destroyed, the VM manager 170 may notify the virtual core queue mapper 110 of information on the created or destroyed VM and information on virtual cores belonging to the created or destroyed VM, or store the information in the virtual core queue table 112 to update information on VMs and virtual cores (S510). The step S510 may be performed independently of steps to be described below.

Then, the virtual core queue mapper 110 may receive input traffic (S520). Also, the virtual core queue mapper 110 may identify a flow to which the input traffic belongs according to the attributes of the input traffic (S530).

At this time, the virtual core queue mapper 110 may check the flow table 111 based on information on the identified flow for the traffic, and determine the corresponding VM and the virtual core queue.

The virtual core queue mapper 110 may search information on the identified flow in the flow table 111 to determine whether the flow to which the traffic belongs is a new flow or a flow already generated (S540).

If the identified flow for the input traffic is an existing flow, the virtual core queue mapper 110 may extract information on the virtual core queue allocated to the identified flow based on the information of the flow table 111, and queue the traffic to the corresponding virtual core queue by mapping the traffic to the corresponding virtual core queue (S541). At this time, the virtual core queue mapper 110 may store data of the traffic in which the flow is identified in the data buffer 180, and queue a pointer indicating the location (address) on the data buffer 180 in which the traffic data is stored in the corresponding virtual core queue belonging to the corresponding VM queues 120-1, . . . , and 102-N. Also, the virtual switch may perform switching of the traffic queued in the corresponding virtual core queue to the corresponding VM.

If the input traffic belongs to a new flow, the virtual core queue mapper 110 may check the statuses of all virtual core queues belonging to the VM corresponding to the flow, based on the information of the virtual core queue table 111 (S542). That is, the virtual core queue mapper 111 may confirm whether the virtual core queues belonging to the VM exceed the threshold value, respectively.

At this time, if all the virtual core queues belonging to the VM exceed the threshold value, a new virtual core queue may be created, and a new flow to which the input traffic belongs may be mapped to the new virtual core queue (S543). That is, the virtual core queue mapper 110 may request the virtual core queue manager 150 to activate the new virtual core queue. At this time, if necessary, the VM manager 170 may activate a VM and a virtual core that can process the newly-activated virtual core queue. The virtual core queue manager 150 may inform the virtual core queue mapper 110 of information on the newly-activated virtual core queue. The virtual core queue mapper 110 may map the new flow to the newly-activated virtual core queue using the information on the virtual core queue that the virtual core queue manager 150 has informed. The virtual core queue mapper 110 may update the information of the flow table 111 based on the received information on the virtual core queue. As described above, the virtual core queue mapper 110 may store the data of the traffic in the data buffer 180, and queue a pointer indicating the location (address) on the data buffer 180 in which the traffic data is stored in the newly-activated virtual core queue.

Also, the virtual core queue manager 150 may notify the virtual switch manager 160 that the new virtual core queue has been activated. At this time, the virtual switch manager 160 may change configuration of the corresponding virtual switch so that the queued traffic can be switched to the newly-activated virtual core queue (S544). The virtual switch may switch the traffic of the virtual core queue to the corresponding VM, and the corresponding VM can process the corresponding traffic. The virtual core queue manager 150 or the virtual core queue mapper 110 may update the virtual core queue table 112 with information on the activated virtual core queue after activating the new virtual core queue at operation (S545).

If at least one of the existing virtual core queues does not exceed the threshold value, the new flow may be mapped to one of the virtual core queues that do not exceed the threshold value (S546). At this time, the mapping of the new flow to the virtual core queue may be based on dynamically configurable mapping policies such as a power saving policy and an operation switching policy.

In case that the mapping policy for the virtual core queue is the power saving policy, the virtual core queue mapper 110 may map the new flow to a virtual core queue in which the largest amount of traffic is queued among the existing virtual core queues the do not exceed the threshold value, and the mapping information may be updated to the flow table 111. The virtual core queue mapper 110 may queue the traffic to the virtual core queue according to the mapping information, and the corresponding virtual switch may switch the traffic of the virtual core queue to the corresponding VM so that the corresponding VM processes the corresponding traffic.

In case that the mapping policy for the virtual core queue is the operation switching policy, the virtual core queue mapper 110 may map the new flow to a virtual core queue in which the least traffic is queued among the existing virtual core queues that do not exceed the threshold value. Also, the virtual core queue mapper 111 may update the flow table 111 with the mapping information generated by the above procedure (S547).

The virtual core queue mapper 110 may queue the traffic to the corresponding virtual core queue according to the mapping information determined in the steps S543 to S545 or the steps S546 (S550). At this time, the virtual core queue mapper 110 may transfer the information specifying the VM and the virtual core queue allocated to the traffic as meta information included in the corresponding traffic to the virtual switch (S560).

The virtual switch may transfer the traffic to the VM corresponding to the virtual core queue based on the meta information included in the traffic. Also, the virtual distributor of the VM may receive the corresponding traffic and may transfer the traffic to the corresponding virtual core based on the mapping information for specifying the VM and the virtual core corresponding to the traffic (S570). Finally, the corresponding virtual core may process the corresponding traffic (S580).

The methods according to exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A parallel processing method for traffic having an order, the method supporting virtual core automatic scaling in a virtual environment having at least one virtual machine (VM) and at least one virtual core queue for each VM, comprising:

identifying a flow of the traffic according to attributes of the traffic;

determining a virtual core queue to which the traffic is mapped according to the identified flow and queuing the traffic to the determined virtual core queue; and transferring the traffic from the determined virtual core queue to a VM corresponding to the determined virtual core queue through a virtual switch, wherein traffic belonging to a same flow is queued to a same virtual core queue and processed by a same virtual core, in order to maintain the order of the traffic to be processed and not to cause a re-ordering of the traffic having the order, and wherein the virtual core queue to which the traffic is queued is selected from virtual core queues belonging to a VM allocated to the identified flow based on at least one of a power saving policy or an operation switching policy.

2. The parallel processing method according to claim 1, wherein, in the identifying the flow of the traffic, the flow of the traffic is identified based on a hash function value for specific information in a header of a packet belonging to the traffic.

3. The parallel processing method according to claim 2, wherein the specific information in the header of the packet belonging to the traffic is a combination of at least one field value of a source IP address (SIP), a destination IP address (DIP), a source port (SPORT), a destination port (DPORT), and a protocol version (PROTOCOL).

4. The parallel processing method according to claim 1, wherein, in the queuing the traffic, the traffic is stored in a data buffer, and a pointer pointing to a location where the traffic is stored in the data buffer is queued to the determined virtual core queue.

5. The parallel processing method according to claim 1, wherein, in the queuing the traffic, the traffic is queued to the virtual queue allocated to the identified flow when the virtual core queue allocated to the identified flow exists; and the traffic is queued to a virtual core queue selected from the virtual core queues belonging to the VM allocated to the identified flow or a newly created virtual core queue when the virtual core queue allocated to the identified flow does not exist.

6. The parallel processing method according to claim 1, wherein according to the power saving policy, the flow of the traffic is mapped to a virtual core queue in which a largest amount of traffic is queued among existing virtual core queues having a length that does not exceed a threshold value, and according to the operation switching policy, the flow of the traffic is mapped to a virtual core queue in which a least amount of traffic is queued among the existing virtual core queues having the length that does not exceed the threshold value.

7. The parallel processing method according to claim 1, wherein, in the transferring the traffic, the traffic is transferred to a virtual core corresponding to the determined virtual core queue in a VM to which the determined virtual core queue belongs.

8. The parallel processing method according to claim 7, wherein the traffic is transferred to the virtual core corresponding to the determined virtual core queue in the VM to which the determined virtual core queue belongs based on meta information included in the traffic.

9. A parallel processing apparatus for traffic having an order, the apparatus supporting virtual core automatic scaling, comprising at least one processor configured to execute instructions to implement:

a virtual machine (VM) manager for creating and managing at least one VM;

a virtual core queue manager for creating and managing at least one virtual core queue for each VM;

a virtual core queue mapper for identifying a flow of the traffic according to attributes of the traffic, determining a virtual core queue to which the traffic is mapped according to the identified flow, and queuing the traffic to the determined virtual core queue; and at least one virtual switch for transferring the traffic from the determined virtual core queue to a VM corresponding to the determined virtual core queue, wherein traffic belonging to a same flow is queued to a same virtual core queue and processed by a same virtual core, in order to maintain the order of the traffic to be processed and not to cause a re-ordering of the traffic having the order, and wherein the virtual core queue to which the traffic is queued is selected from virtual core queues belonging to a VM allocated to the identified flow based on at least one of a power saving policy or an operation switching policy.

10. The parallel processing apparatus according to claim 9, wherein the virtual core queue mapper identifies the flow of the traffic based on a hash function value for specific information in a header of a packet belonging to the traffic.

11. The parallel processing apparatus according to claim 10, wherein the specific information in the header of the packet belonging to the traffic is a combination of at least one field value of a source IP address (SIP), a destination IP address (DIP), a source port (SPORT), a destination port (DPORT), and a protocol version (PROTOCOL).

12. The parallel processing apparatus according to claim 10, further comprising a flow table defining relationship between traffics and flows, wherein the virtual core queue mapper identifies the flow of the traffic based on the flow table.

13. The parallel processing apparatus according to claim 9, further comprising a virtual switch manager managing the at least one virtual switch, wherein the virtual switch manager adds a new virtual switch, or deactivates a part of the at least one virtual switch according to a processing load of the at least one virtual switch.

14. The parallel processing apparatus according to claim 9, wherein the virtual core queue mapper stores the traffic in a data buffer, and queues a pointer pointing to a location where the traffic is stored in the data buffer to the determined virtual core queue.

15. The parallel processing apparatus according to claim 9, wherein the virtual core queue mapper queues the traffic to the virtual queue allocated to the identified flow when the virtual core queue allocated to the identified flow exists; and queues the traffic to a virtual core queue selected from the virtual core queues belonging to the VM allocated to the identified flow or a newly created virtual core queue when the virtual core queue allocated to the identified flow does not exist.

16. The parallel processing apparatus according to claim 15, wherein according to the power saving policy, the flow of the traffic is mapped to a virtual core queue in which a largest amount of traffic is queued among existing virtual core queues having a length that does not exceed a threshold value, and according to the operation switching policy, the flow of the traffic is mapped to a virtual core queue in which a least amount of traffic is queued among the existing virtual core queues having the length that does not exceed the threshold value.

17. The parallel processing apparatus according to claim 9, wherein the VM corresponding to the determined virtual core queue includes a virtual network interface card (vNIC) and a virtual distributor (vDistributor) which transfer the traffic transferred from the virtual switch to the determined virtual core queue.

18. The parallel processing apparatus according to claim 17, wherein the traffic is transferred to a virtual core corresponding to the determined virtual core queue in a VM to which the determined virtual core queue belongs based on meta information included in the traffic.

* * * * *